(12) United States Patent
Pageau et al.

(10) Patent No.: US 6,923,873 B2
(45) Date of Patent: Aug. 2, 2005

(54) PAINT STRIPPING COMPOSITION AND METHOD OF USING THE SAME

(75) Inventors: Daniel Pageau, Montreal (CA); Elizabeth Marcu, Montreal (CA); David Aston, Montreal (CA)

(73) Assignee: Greensolv Environmental Products Inc., Baie d'Urfe ( * ) Notice: Subject to any disclaimer, the term of this patent is extended or adjusted under 35 U.S.C. 154(b) by 0 days.

(21) Appl. No.: 10/451,815

(22) PCT Filed: Jan. 18, 2002

(86) PCT No.: PCT/CA02/00061

§ 371 (c)(1), (2), (4) Date: Feb. 25, 2004

(87) PCT Pub. No.: WO02/057375

PCT Pub. Date: Jul. 25, 2002

(65) Prior Publication Data

US 2004/0138077 A1 Jul. 15, 2004

(30) Foreign Application Priority Data

Jan. 19, 2001 (CA) ............................. 2331439

(51) Int. Cl.⁷ ................................. B08B 3/00
(52) U.S. Cl. .................... 134/38; 510/201; 510/208; 510/212; 510/213; 510/407; 134/2; 134/34; 134/36; 134/40; 134/42
(58) Field of Search ................. 510/201, 208, 510/212, 213, 407; 134/2, 38, 34, 36, 40, 42

(56) References Cited

U.S. PATENT DOCUMENTS

| 4,403,029 A | * | 9/1983 | Ward, Jr. et al. | 510/176 |
|---|---|---|---|---|
| 4,617,251 A | | 10/1986 | Sizensky | 430/256 |
| 4,732,695 A | | 3/1988 | Francisco | 252/162 |
| 4,770,713 A | * | 9/1988 | Ward | 510/212 |
| 4,780,235 A | | 10/1988 | Jackson | 252/170 |
| 5,894,854 A | | 4/1999 | Miles | 134/38 |
| 5,932,530 A | | 8/1999 | Radu et al. | 510/212 |
| 5,952,277 A | | 9/1999 | Radu et al. | 510/212 |
| 6,130,192 A | | 10/2000 | Vitomir | 510/212 |
| 6,358,901 B1 | * | 3/2002 | Joye et al. | 510/201 |

FOREIGN PATENT DOCUMENTS

| WO | WO0202699 A1 | * | 2/2002 |
|---|---|---|---|
| WO | WO02057375 A2 | * | 7/2002 |

* cited by examiner

Primary Examiner—Sharidan Carrillo
(74) Attorney, Agent, or Firm—George J. Primak

(57) ABSTRACT

This invention concerns paint stripping compositions which are particularly suitable for stripping paint off aircraft. The basic composition consists of a mixture of specific amounts of the following substances: aromatic hydrocarbons, dimethyl formamide; N-methylpyrrolidone; benzyl alcohol; alkanolamine; wax; wetting agent; and thickening agent. A modified composition may also contain dimethyl sulfoxide and a terpene solvent. The invention also includes the method of stripping paint from an aircraft by applying the new stripping composition onto the surface of the aircraft allowing the paint to soften and loosen under the action of the composition, or to penetrate under the paint coating, and then gently removing both the loosened paint and the stripping composition from the aircraft surface without damaging the surface.

20 Claims, No Drawings

PAINT STRIPPING COMPOSITION AND METHOD OF USING THE SAME

FIELD OF THE INVENTION

This invention relates to compositions usually called "paint strippers" or "paint removers", which are used for stripping or removing paint from a substrate. In particular, it relates to such paint stripping compositions that are suitable for removing paint off aircraft and similar metallic bodies that normally include aluminum or aluminum alloys as a component.

BACKGROUND OF THE INVENTION

Many paint removing compositions are already known in the art. Usually, they are produced to satisfy certain specific requirements.

For example, U.S. Pat. No. 4,617,251 discloses a stripping composition for effectively removing an organic polymeric material from a substrate. It is specifically prepared in the absence of phenol compounds.

U.S. Pat. No. 4,732,695 relates to a paint stripper and coatings remover composition which is particularly suitable for removing paint from various equipment employed in automobile paint booths. It consists of a mixture of benzyl alcohol, an aromatic naphtha and a substance selected from N-methyl 2-pyrrolidone (NMP) and N-vinyl 2-pyrrolidone (NVP).

In U.S. Pat. No. 5,894,854 there is disclosed a method for stripping paint from non-ferrous substrates, such as automobile and aircraft exterior parts. It uses as the stripping composition alkylphenol-hydroxypolyoxyethylene admixed with triethanolamine and the stripping is carried out at a temperature of 350° F. This patent provides a good description of the problems encountered in stripping paint from objects such as aircraft parts, when using known paint strippers.

In applicant's own U.S. Pat. No. 5,932,530, there is disclosed and claimed a synergistic paint removing composition suitable for stripping paint from substrates such as wood, iron or steel, or plastic such as polypropylene. It consists of the following composition:

| | |
|---|---|
| 5–55% | NMP (N-methyl pyrrolidone) |
| 6–45% | Dibasic ester |
| 5–40% | Terpene (D-Limonene) |
| 2–15% | Ethylene glycol monoethyl ether acetate |
| 0.5–3% | Wetting agent |

Moreover, in U.S. Pat. No. 5,952,277 in which the present applicant is a co-assignee, another synergistic paint removing composition is disclosed which is particularly suitable for removing urethane based paints, melamine based paints, epoxy based paints and powder coating paints from wood, iron or steel and plastic such as polypropylene. This composition essentially consists of:

| | |
|---|---|
| 20–45% | Aromatic hydrocarbons |
| 15–30% | DMF (dimethyl formamide) |
| 15–25% | NMP (N-methyl pyrrolidone) |
| 5–15% | Terpene (D-Limonene) |
| 0.5–4% | Wetting agent |

OBJECTS AND SUMMARY OF THE INVENTION

It is an object of the present invention to provide a new paint stripping composition that is particularly suitable for stripping paint off aircraft, although it can also be used for other paint stripping operations.

Another object of the invention is to provide a composition that has a reduced odour.

A still further object is to provide a simple and efficient method for stripping paint with the new composition.

Other objects and advantages of the invention will become apparent from the following description thereof.

The basic paint stripping composition according to the present invention consists essentially of:

| | |
|---|---|
| 1–20% | aromatic or aliphatic hydrocarbons |
| 30–50% | dimethyl formamide (DMF) |
| 15–25% | N-methyl pyrrolidone (NMP) |
| 5–20% | benzyl alcohol |
| 1–10% | alkanolamine |
| 1–15% | wax |
| 0.5–4% | wetting agent |
| 0.5–5% | thickening agent | all percentages being by weight:

In the above formulation, the aromatic hydrocarbons, which are also known under the name "aromatic naphtha" are products such as sold by the company Petro Canada under the trade mark PETROSOL 100 or Ashland Chemicals under the trade mark HI SOL 10. The aliphatic hydrocarbons can be solvents such as NORPAR 15 of Exxon Mobil Chemical Company, or ISOPAR K of Imperial Oil.

The alkanolamine may be selected from 2-aminoethanol, diethanolamime and triethanolamine, as well as ethanolamines and propanolamines.

The wax may be paraffin wax, polyethylene wax or polypropylene wax or other suitable waxes that restrict loss of solvents by volatilization.

The wetting agents are those normally used in paint stripping compositions. Particularly suitable wetting agents are compounds selected from the group of $C_{12}$–$C_{15}$ alcohols and mixtures thereof, and 0.5 to 2% of an ethoxylated nonylphenol derivative of the formula $C_9H_{18}C_6H_4O(CH_2CH_2-O)_\alpha H$ where $\alpha$ is an integer ranging from 4 to 11. Although the above wetting agents are preferred, other suitable wetting agents can also be used. Many such wetting agents are mentioned in the prior art literature.

The thickening agents are standard thickening agents used to increase the viscosity of the formulation so that the product would adhere to the area from which the paint is being stripped, such as the vertical and underlying surfaces of an aircraft. For example, but without restriction, ethyl cellulose or hydroxypropyl methyl cellulose can be used for this purpose. Such thickening agents have already been disclosed in prior art references, such as U.S. Pat. No. 4,780,235.

It has further been found that the above composition can be modified by the addition of dimethyl sulfoxide and of a terpene solvent to achieve a significant improvement in the performance of the paint stripper, particularly on paints based on polyurethane coating systems, which are very difficult to strip because they involve epoxy primer coatings with polyurethane topcoats.

Such modified paint stripping composition according to the present invention consists essentially of:

| | |
|---|---|
| 1–20% | aromatic hydrocarbons |
| 15–45% | dimethyl formamide (DMF) |
| 15–25% | N-methyl pyrrolidone (NMP) |
| 5–20% | benzyl alcohol |
| 1–10% | alkanolamine |
| 1–15% | wax |
| 1–8% | wetting agent |
| 0.5–5% | thickening agent |
| 1–10% | dimethyl sulfoxide |
| 1–20% | terpene solvent | all percentages being by weight.

The preferred range of the dimethyl sulfoxide in the modified composition is 1–5% by weight and the preferred range of the terpene solvent(s) is 4–16% by weight As terpene solvents, various terpenes and terpineols can be used, including D-limonene which is an effective natural terpene solvent and various synthetic terpenes and terpineols.

The basic paint stripping composition of the present invention softens the paint and breaks the paint film into very small pieces. The modified paint stripping composition penetrates through the paint film and then spreads rapidly along the paint/metal interface, lifting the paint off in large sections, almost as a continuous film. There are two benefits achieved with this effect, namely:

1. The paint separates and lifts completely off the metal surface, yet remains in large pieces which can be easily removed from the metal surface.
2. The stripping performance is significantly faster with the modified composition.

Thus, the modified paint stripping composition of the present invention is more effective than the basic composition, particularly on polyurethane coating systems, which are rather difficult to strip.

In addition to the above, the composition of the present invention, both basic and modified, may also contain other substances which are commonly present in paint strippers, such as surfactants and pigments in minor amounts. For example, up to about 0.05% of a pigment may be added if colour is needed for some reason. Surfactants, such as disclosed in U.S. Pat. No. 4,780,235 or U.S. Pat. No. 6,130,192 may also be added in effective amounts which are usually in a similar range as the wetting agents and the thickening agents.

Thus, the novel paint stripping composition of the present invention is based on the discovery that when certain selected substances, that in most cases have already been used in various known paint removing compositions, are mixed together in specific amounts, they surprisingly result in a paint stripping composition that is capable of stripping paint off aircraft and similar metallic bodies with great efficiency. The novel stripper is effective in a short period of time. As little as two hours is usually required to soften and strip the paint from an aircraft and one application of the novel paint stripper is usually sufficient, thus avoiding repeated applications that are often needed when using other known stripping compositions.

The novel stripping composition does not attack aluminum or other metals which are usually used in aircraft construction or construction of vehicles and the like. After the stripper has softened and loosened the paint, both the paint and the stripper slide off the aluminum metal surface of the aircraft with minimal scraping, scrubbing or mechanical effort, thus minimizing any damage to such surface.

Finally, the novel stripping composition has a considerably reduced odour as compared to similar previous products.

The method of using the novel paint stripping composition on metallic bodies, such as those of an aircraft, is simple and efficient It comprises the steps of applying the paint stripping composition to the surface of the body to be stripped of paint, allowing the paint to soften and loosen under the action of the composition, and thereafter removing the loosened paint and the stripping composition from the metallic body in a manner that will not damage the body. This is particularly well suited for stripping paint from the surface of an aircraft made of aluminum or aluminum alloys or containing the same. It will be appreciated that this method is far more convenient than the one, for example, disclosed in U.S. Pat. No. 5,894,854 which requires immersing the nonferrous substrate into the stripping composition and heating the same to 350° F., and which consequently could not be used on the entire aircraft.

DESCRIPTION OF THE PREFERRED EMBODIMENTS

Formulation 1 of the paint stripper in accordance with the present invention had the following composition:

| | |
|---|---|
| 17.5% | aromatic hydrocarbons |
| 34% | DMF |
| 19% | NMP |
| 10% | benzyl alcohol |
| 5% | alkanolamine |
| 10% | wax |
| 1.5% | wetting agent |
| 3% | thickening agent | all percentages being by weight.

This Formulation 1 paint stripper was applied to a helicopter using the above described method and stripped the paint quickly and effectively without any damage to the surface of the helicopter, However, several applications of this paint stripper were required in some small areas. Also, some effort was required to remove all the paint from the helicopter.

Formulation 2 of the paint stripper in accordance with the present invention had the following composition:

| | |
|---|---|
| 10% | aliphatic hydrocarbon |
| 36% | DMF |
| 21% | NMP |
| 13% | benzyl alcohol |
| 5% | alkanolamine |
| 10% | paraffin or polyethylene wax |
| 2% | wetting agent |
| 3% | thickening agent | all percentages being by weight.

In this formulation, an aliphatic hydrocarbon solvent was used instead of aromatic hydrocarbon A Lear Jet was stripped with this Formulation 2 by applying the paint stripper to the surface of the Jet and subsequently removing the stripped paint. Only one application of the paint stripper was required. The time required to strip the paint was about 8 hours.

Formulation 3 of the paint stripper in accordance with the present invention had the following composition:

| | |
|---|---|
| 10% | aromatic hydrocarbon |
| 33% | DMF |
| 21.66% | NMP |
| 7.5% | benzyl alcohol |
| 2% | alkanolamine |
| 10% | paraffin or polyethylene wax |
| 5% | wetting agent |
| 1.34% | thickening agent |
| 7.5% | terpineol |
| 2.0% | dimethyl sulfoxide | all percentages being by weight.

Formulation 3 was applied on a Bombardier CRJ 200, an aircraft painted with a polyurethane coating system. The operation of stripping the aircraft was completed with just one application in a time period of 2–5 hours to essentially completely lift the paint off the metal. Any residual paint was easily removed with a brush Obvious modifications to the formulations described above can be made without departing from the invention and the scope of the following claims.

What is claimed is:

1. A paint stripping composition consisting essentially of:

| | |
|---|---|
| 1–20% | aromatic or aliphatic hydrocarbons |
| 30–50% | dimethyl formamide |
| 15–25% | N-methyl pyrrolidone |
| 5–20% | benzyl alcohol |
| 1–10% | alkanolamine |
| 1–15% | wax |
| 0.5–4% | wetting agent |
| 0.5–5% | thickening agent | all percentages being by weight.

2. A paint stripping composition consisting essentially of:

| | |
|---|---|
| 1–20% | aromatic hydrocarbons |
| 15–45% | dimethyl formamide |
| 15–25% | N-methyl pyrrolidone |
| 5–20% | benzyl alcohol |
| 1–10% | alkanolamine |
| 1–15% | wax |
| 1–8% | wetting agent |
| 0.5–5% | thickening agent |
| 1–10% | dimethyl sulfoxide |
| 1–20% | terpene solvent | all percentages being by weight.

3. A paint stripping composition consisting essentially of:

| | |
|---|---|
| 17.5% | aromatic hydrocarbons |
| 34% | dimethyl formamide |
| 19% | N-methyl pyrrolidone |
| 10% | benzyl alcohol |
| 5% | alkanolamine |
| 10% | wax |
| 1.5% | wetting agent |
| 3% | thickening agent | all percentages being by weight.

4. A paint stripping composition consisting essentially of:

| | |
|---|---|
| 10% | aliphatic hydrocarbons |
| 36% | dimethyl formamide |
| 21% | N-methyl pyrrolidone |
| 13% | benzyl alcohol |
| 5% | alkanolamine |
| 10% | wax |
| 2% | wetting agent |
| 3% | thickening agent | all percentages being by weight.

5. A paint stripping composition consisting essentially of:

| | |
|---|---|
| 10% | aromatic hydrocarbons |
| 33% | dimethyl formamide |
| 21.66% | N-methyl pyrrolidone |
| 7.5% | benzyl alcohol |
| 2% | alkanolamine |
| 10% | wax |
| 5% | wetting agent |
| 1.34% | thickening agent |
| 7.5% | terpineol |
| 2% | dimethyl sulfoxide | all percentages being by weight.

6. A paint stripping composition according to any one of claims 1 to 5, in which the alkanolamine is selected from the group consisting of ethanolamines and propanolamines.

7. A paint stripping composition according to any one of claims 1 to 5, in which the alkanolamine is selected from the group consisting of 2-aminoethanol, diethanolamine and triethanolamine.

8. A paint stripping composition according to any one of claims 1 to 5, in which the wax is selected from the group consisting of paraffin wax, polyethylene wax and polypropylene wax.

9. A paint stripping composition according to any one of claims 1 to 5, in which the wetting agent is selected from the group consisting of $C_{12}$–$C_{15}$ alcohols, ethoxylated $C_{12}$–$C_{15}$-alcohols and their mixtures, and 0.5 to 2% of an ethoxylated nonylphenol of the formula $C_9$—$H_{18}C_6H_4O(CH_2CH_2$—$O)_\alpha H$ where $\alpha$ is an integer ranging from 4 to 11.

10. A paint stripping composition according to any one of claims 1 to 5, in which the thickening agent is ethyl cellulose or hydroxypropyl methyl cellulose.

11. A paint stripping composition according to any one of claims 1 to 5, further including a pigment in an effective amount to provide colour to the composition, if such is needed.

12. A paint stripping composition according to any one of claims 1 to 5, further including a surfactant.

13. A method of stripping paint from a metallic body, which comprises applying a paint stripping composition defined in any one of claims 1 to 5 to the metallic body and allowing the paint to soften and loosen under the action of said paint stripping composition, and thereafter removing the loosened paint and said paint stripping composition from the metallic body in a manner that will not damage the body.

14. A paint stripping composition according to claim 2, in which the terpene solvent is in the amount of 4–16% by weight.

15. A paint stripping composition according to claim 2, in which the terpene solvent is a natural terpene solvent or is made of synthetic terpenes or terpineols.

16. A paint stripping composition according to claim 15 in which the natural terpene solvent is D-limonene.

17. A paint stripping composition according to any one of claims 2, 14, 15 or 16, in which the dimethyl sulfoxide is in the amount of 1–5% by weight.

18. A method of stripping paint from a metallic body coated with a polyurethane coating, which comprises applying to the metallic body a paint stripping composition defined in claim 2, and allowing the paint stripping composition to penetrate through the polyurethane coating, and thereafter lifting the polyurethane coating off the metallic body in a manner that does not damage the metallic body.

19. A method according to claim 18, in which the metallic body is made of aluminum or aluminum alloys or comprises the same.

20. A method according to claims 18 or 19, in which the metallic body is that of an aircraft.

* * * * *